United States Patent [19]
Dahl et al.

[11] Patent Number: 6,153,293
[45] Date of Patent: Nov. 28, 2000

[54] EXTRUDED WOOD POLYMER COMPOSITE AND METHOD OF MANUFACTURE

[76] Inventors: Michael E. Dahl, 424 Woodside Ave., Hinsdale, Ill. 60521; Robert G. Rottinghaus, 929 Division St., Lisle, Ill. 60532; Andrew H. Stephens, 323 S. Lincoln St., Hinsdale, Ill. 60521

[21] Appl. No.: 09/244,641

[22] Filed: Feb. 4, 1999

[51] Int. Cl.[7] .............................. C08L 97/00; C08K 11/00
[52] U.S. Cl. .................................... 428/310.5; 428/306.6; 428/308.4; 264/118; 264/122; 264/913; 264/920; 264/45.1; 264/45.3; 264/45.8; 264/45.9
[58] Field of Search ...................................... 264/118, 122, 264/913, 920, 45.1, 45.3, 45.8, 45.9; 428/306.6, 308.4, 310.5

[56] References Cited

U.S. PATENT DOCUMENTS

| | | |
|---|---|---|
| 225,822 | 3/1880 | Grossman . |
| 3,546,143 | 12/1970 | Corbett . |
| 3,560,324 | 2/1971 | Quackenbush . |
| 3,718,536 | 2/1973 | Downs et al. . |
| 3,888,810 | 6/1975 | Shinomura . |
| 3,908,902 | 9/1975 | Collins et al. . |
| 3,956,541 | 5/1976 | Pringle . |
| 3,993,721 | 11/1976 | Soda et al. . |
| 4,003,866 | 1/1977 | Paturle . |
| 4,056,591 | 11/1977 | Goettler et al. . |
| 4,091,153 | 5/1978 | Holman . |
| 4,145,389 | 3/1979 | Smith . |
| 4,225,640 | 9/1980 | Erb . |
| 4,228,116 | 10/1980 | Colombo et al. . |
| 4,686,251 | 8/1987 | Ostermann et al. . |
| 4,708,623 | 11/1987 | Aoki et al. . |
| 4,791,020 | 12/1988 | Kokta . |
| 4,915,764 | 4/1990 | Miani . |
| 4,968,463 | 11/1990 | Levasseur . |
| 5,002,713 | 3/1991 | Palardy et al. . |

(List continued on next page.)

OTHER PUBLICATIONS

Brochure—SmartDeck® (not dated).
SmartDeck™ Home Page print out Dec. 9, 1998.
"Mobil Closing Florida Plastic Lumber Plant" 1994 Newsarticle, Roger King (unknown origin).
"Trex Company, LLC, Announces New Plant Site in Nevada," Business Wire, Dec. 9, 1998.
"Study of Porous Artificial Wood Based on Foamable Composites of LDPE and Wood Flour," Paladugula and Shutov, Dept. of Chemical Engineering, Tennessee Technological University, ANTEC '98 / 1855.
"Twin Screw Extrusion Systems," Cincinnati Milacron Marketing Company, #PM–592 (Brochure).

Primary Examiner—Richard Weisberger
Attorney, Agent, or Firm—Bullwinkel Partners, Ltd.

[57] ABSTRACT

An extruded composite structural artificial lumber product is manufactured from wood fiber and polyethylene, including recycled polyethylene, by reducing the wood fiber and polyethylene each to a finely divided particles, mechanically mixing the wood fiber and polyethylene particles together with a measured amount of a powdered endothermic foaming agent, mechanically mixing the mixture, without prepelletization, in a twin-screw extruder where it is compressed and heated until it becomes plastic and homogenous, and then extruding the plastic mixture, using vacuum to remove vaporized moisture and other excess volatiles, through a molding die which forms structural profile of the desired product. The endothermic foaming agent ingredient causes greater expansion in the center of the extruded profile, thereby compressing a greater proportion of plastic material against the sides of the extrusion die, increasing the density and strength on the outside of the extrusion, and reducing the density (with no significant loss of overall strength) on the inside. The resulting extruded artificial lumber product has a specific gravity of about 1.0, plus or minus 20%, with no significant variation in dimensions after cooling.

16 Claims, 3 Drawing Sheets

U.S. PATENT DOCUMENTS

| | | |
|---|---|---|
| 5,008,310 | 4/1991 | Beshay . |
| 5,055,247 | 10/1991 | Ueda et al. . |
| 5,075,057 | 12/1991 | Hoedl . |
| 5,082,605 | 1/1992 | Brooks et al. . |
| 5,084,135 | 1/1992 | Brooks et al. . |
| 5,087,400 | 2/1992 | Theuveny . |
| 5,088,910 | 2/1992 | Goforth et al. . |
| 5,096,046 | 3/1992 | Goforth . |
| 5,096,406 | 3/1992 | Brooks et al. . |
| 5,100,545 | 3/1992 | Brooks . |
| 5,124,168 | 6/1992 | McMillin et al. . |
| 5,151,238 | 9/1992 | Earl et al. . |
| 5,213,021 | 5/1993 | Goforth et al. . |
| 5,217,655 | 6/1993 | Schmidt . |
| 5,238,633 | 8/1993 | Jameson . |
| 5,268,074 | 12/1993 | Brooks et al. . |
| 5,277,758 | 1/1994 | Brooks et al. . |
| 5,285,973 | 2/1994 | Goforth et al. . |
| 5,351,895 | 10/1994 | Brooks et al. . |
| 5,416,139 | 5/1995 | Zeiszler . |
| 5,480,602 | 1/1996 | Nagaich . |
| 5,486,553 | 1/1996 | Deaner et al. . |
| 5,516,472 | 5/1996 | Laver . |
| 5,540,244 | 7/1996 | Brooks et al. . |
| 5,746,958 | 5/1998 | Gustafsson et al. . |
| 5,759,680 | 6/1998 | Brooks et al. . |
| 5,827,462 | 10/1998 | Brandt et al. . |
| 5,827,607 | 10/1998 | Deaner et al. . |

EXTRUDED WOOD POLYMER COMPOSITE AND METHOD OF MANUFACTURE

FIELD OF THE INVENTION

This invention relates to an extruded composite artificial lumber product manufactured from wood fiber and polyethylene, including recycled polyethylene, and its method of manufacture.

DESCRIPTION OF THE PRIOR ART

The prior art reflects many attempts to make an acceptable artificial lumber out of wood fiber and thermoplastics, particularly using recycled materials. Some, such as the product and process disclosed in Laver U.S. Pat. No. 5,516,472 *Extruded Synthetic Wood Composition and Method for Making Same*, have enjoyed some commercial utility as being a relatively cost-efficient means of re-using materials, which might otherwise be wasted, in the manufacture of lumber-like products which are relatively strong, dimensionally stable and moisture-resistant. Laver teaches that a cellulosic wood fiber material may be mixed with a thermoplastic material and a cross-linking material, all of which are subject to heat (about 180° C.) and pressure in a twin-screw extruder until they become plastic. The plastic mixture is then extruded through a series of dies including a "stranding" die having multiple orifices in a honeycomb pattern to orient the fibers in the plastic material in a longitudinal direction. The die also includes gas evacuation passages to relieve unwanted process gas, such as from volatile cross-linking agents. As a result, according to Laver, a product is created which may be formed into intricate shapes with no expansion after leaving the molding die. A water spray system cools the product after it leaves the extrusion die, leaving a hardened gloss or glaze on the surface of the product.

Brandt, et al. U.S. Pat. No. 5,827,462 (Oct. 27, 1998) discloses an extruded synthetic wood product using a twin screw extruder discharging a plasticized material which is 50–70% cellulosic and 20–40% thermoplastic, containing cross-linking agents into a transition die and then a stranding die, and then cooling the extruded product with water spray.

Deaner, et al. U.S. Pat. No. 5,827,607 (Oct. 27, 1998) discloses a method of using a twin screw extruder to form composite thermoplastic pellets having 45–70% polyvinyl chloride and 30–50% wood fiber (not wood flour), and being at least 0.1 mm long with an aspect ratio of 1.8. After being pelletized, the material is used as feedstock for a three stage extruder in which the pellets are mixed, melted, and then formed at 195–200° C. using a wax lubricant, into structural shapes for doors, windows and the like.

Brooks, et al. U.S. Pat. No. 5,082,605 (Jan. 21, 1992) discloses a method for extruding a composite synthetic wood product containing encapsulated cellulosic fibers. The feed mixture contains polyethylene and up to 10–15% polypropylene, in ratios in a general range of 40/60 to 60/40 fiber/polymer. The desirable fiber particles are no more than 1.5 inches, and the polymeric materials are ground to particles of no more than 0.25 inches. The fiber particles are encapsulated in a jacketed compounder at 300–600° F. Clumps of encapsulated material no more than 1.5 inches in length are introduced into a jacketed extruder, at temperatures less than 450° F., and extruded through a fiber alignment plate and then a heated forming die.

Brooks, et al. U.S. Pat. No. 5,088,910 (Feb. 18, 1992) discloses a system for making synthetic wood products. Wood fiber is mixed with thermoplastic material, including both LDPE and HDPE, in plastic/fiber ratios of 40/60 to 60/40, and then heated and kneaded before being formed into golf-ball sized chunks. A fiber alignment plate is positioned ahead of the final extrusion die. The product is cut to desired length using a flying cutoff knife mounted on a table which tracks the movement of the formed material as it leaves the extruder.

Brooks, et al. U.S. Pat. No. 5,759,680 (Jun. 2, 1998) discloses an extruded fiber/polymer composite material in ratios of 40/60 to 60/40. The feed material is heated to a working temperature between 190° and 350° F. in a jacketed mixer, until it reaches a clumpy, doughy consistency, after which it goes to a size reduction unit, and finally to a compounding extruder using a fiber alignment plate ahead of the final extrusion die. The disclosure teaches that the feedstock should contain no foaming agent, and all but one of the claims reflects that limitation by being limited to "unfoamed" polymeric material. (The one claim not having that limitation is limited to a process which achieves plasticization in a separate "jacketed mixer" prior to extrusion, which makes the process entirely different from the present invention.)

SUMMARY OF THE INVENTION

It is a primary general object of the present invention to provide a superior extruded wood polymer composite and method of manufacture which is easier, cheaper and quicker to manufacture, and requires less complex manufacturing steps and equipment.

A related general object of the invention is to provide a method which will produce a product which has physical properties as good or better than exhibited by prior art products of a similar kind.

A specific object of the invention is to provide a method for manufacturing a superior product which has a lower overall density and specific gravity compared to the prior art, while maintaining all or substantially all of its surface strength, hardness and finish, and moisture resistance. In particular, it is an object to provide an extruded artificial lumber product with similar surface qualities of density, hardness and strength, as the prior art, but having selectively reduced density at its central core. By this means the product of the invention is substantially just as strong as the prior art, but is significantly less dense and more economical to manufacture, and is equal to or superior to the prior art in terms of workability in sawing, drilling, nailing, stapling, and the like.

By the method of the present invention, a high-quality wood-like extruded artificial lumber product is produced by finely dividing wood fiber and polyethylene into particles, and then mechanically mixing them together with a measured amount of a powdered endothermic foaming or blowing agent. The resulting feed mix is directly introduced, without pre-pelletization, into a conventional twin-screw extruder where it is compressed and heated into a homogenous plastic state, and then extruded through a molding die to form the structural profile of the desired product. Gases, consisting of vaporized moisture from the feedstock and excess process gas from the foaming agent, is removed by vacuum through passages in the extruder ahead of the molding die. In the process, the carefully controlled amount of foaming agent ingredient has the desirable effect of reducing the density at the center of the extruded profile, while allowing the outer surfaces to remain dense, hard and strong. This has the overall desirable effect of producing a product which is relatively stronger with respect to its density, while continuing to present a smooth, hard well-finished external appearance.

It is believed that the controlled amount of foaming agent causes a greater degree of expansion in the center of the extruded profile than at its perimeter, thereby compressing a greater proportion of plastic material against the sides of the extrusion die. This has the effect of increasing the density and strength on the outside of the extrusion, while reducing the density (with no significant loss of overall strength) on the inside. The resulting extruded artificial lumber product can be selectively made with a specific gravity of 1.0, plus or minus 20%, with no significant variation in external dimensions after cooling.

THE DRAWINGS

DETAILED DESCRIPTION OF THE INVENTION

Figure 1:
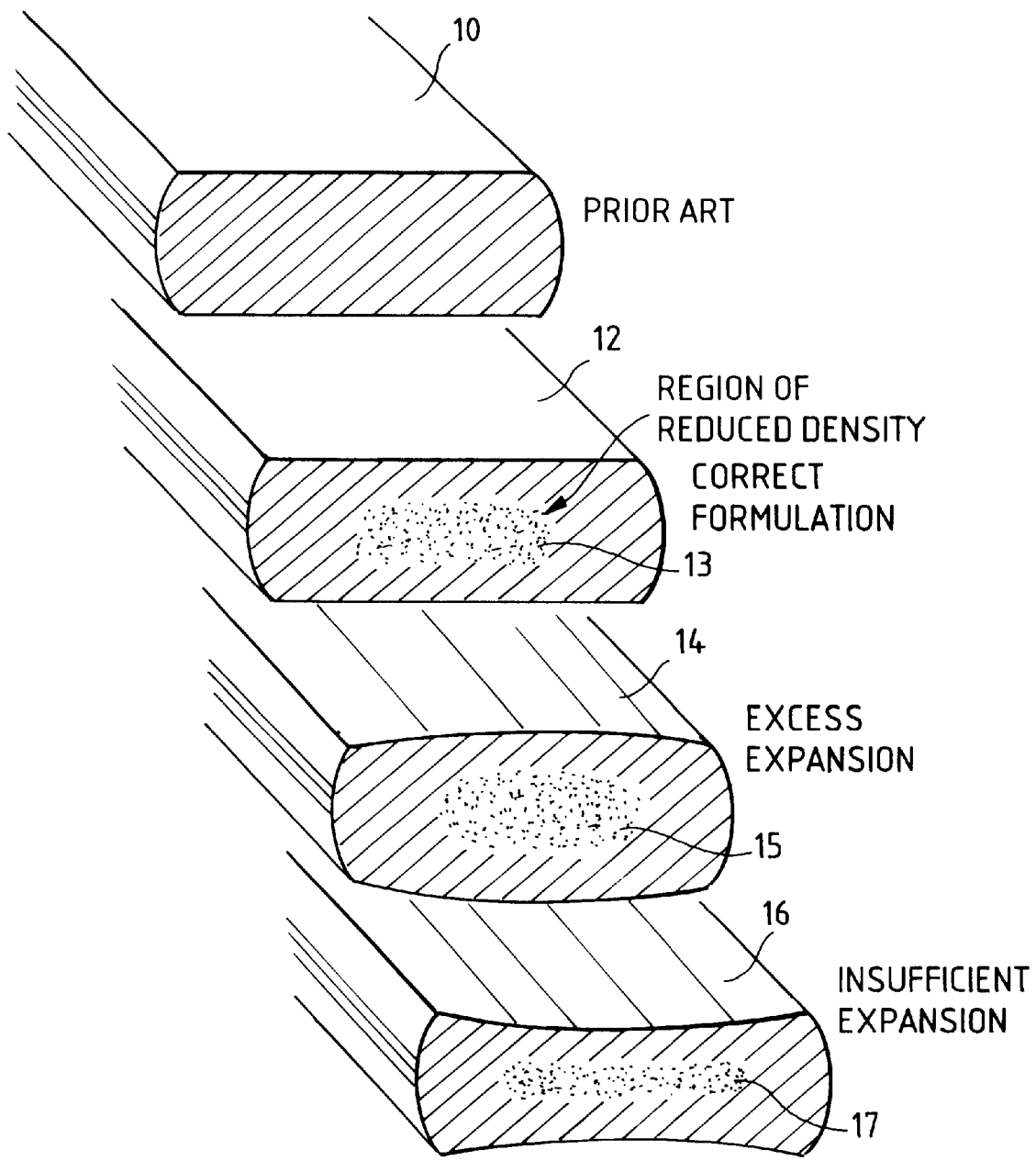
FIG. 1 is a perspective view of four extruded artificial products, of which one represents a typical prior art product for comparison purposes, and three have been manufactured according to the present invention.

Turning to the drawings, there is shown in FIG. 1 a typical prior art extruded lumber product 10, such as might be manufactured using the process taught in the Laver U.S. Pat. No. 5,516,472. The product 10 might typically be produced in ten foot lengths, with dimensions of 6 inches by 5/4 inches (nominal) and 10, 12 or 16 feet in length. This product finds great utility in outdoor benches, tables, and railings, and as deck planking for exterior porches exposed to the weather year-round. Such a prior art product might typically be composed of about two parts finely divided wood fiber and one part finely divided recycled thermoplastic material, along with a lesser amount of thermosetting plastic material. The finely divided ingredients can be mixed directly prior to introduction into an extruder, or they can be pre-pelletized, in the method taught by Deaner, et al. U.S. Pat. No. 5,827,607. Typically, a multiple-stage molding die having a fiber alignment plate or stranding die is used, which aligns the wood fibers, but also cause a high level of back pressure in the extruder.

Such prior art artificial lumber planking, while not generally as strong as natural wood, exhibits other favorable qualities. It is generally maintenance free, and can be exposed to the elements indefinitely without significant degradation of either appearance or strength. As for ease of fabrication, it is quite similar to wood in that it can be drilled, sawed, and nailed, and can receive screw and other fasteners, with results very similar to natural wood.

However, despite the advantages set forth above, prior art artificial lumber products such as the illustrated example 10 often exhibit deficiencies which can seriously and adversely affect their utility and longevity in certain applications. For example, it has been found that extruded composite products manufactured using the stranding die technology taught in the Laver U.S. Pat. No. 5,516,472 will sometimes suffer from moisture absorption, possibly as a result of having a lower thermoplastic content together with the presence microscopic longitudinal channels created by the forced alignment of the wood fibers during the extrusion process. As a result, the product has, in effect, an "end grain" through which moisture can enter, causing eventually swelling, warping and distortion which can upset the dimensional stability of any structure manufactured with these materials.

In addition, while the prior art extruded artificial lumber products 10 generally have a superior surface in terms of strength, hardness and appearance, they are generally quite dense, with some having specific gravities substantially higher than 1.0, meaning that they consume more raw materials per board foot of product, and have a poorer strength-to-weight ratio in comparison to natural wood. They will not float at all.

Finally, the manufacture of prior art artificial lumber products 10 by the prior art methods described above is relatively costly and time-consuming because of the need for either pre-pelletization or a pre-melt step in some cases, and for multiple-part extrusion dies (including stranding dies) in others.

Referring again to the drawings, there are also shown in FIG. 1 three additional extruded artificial lumber sections 12, 14 and 16, in the form of deck planks, manufactured according to the present invention. Improved plank 12 exhibits the same hard, strong, smooth surface as prior art plank 10, but has at its center a region 13 of reduced density which lowers the overall density and weight of the plank without significantly affecting its strength. Even though the density reduction may reduce the tensile strength and modulus of the product at its center, the fact that the outer surfaces are effectively unaffected causes the overall strength and modulus of the product to be substantially unchanged.

The density reduction of plank 12 at its center 13 is achieved by the addition of a controlled quantity of foaming agent, preferably up to 1% of an endothermic foaming agent such as bicarbonate of soda. This agent is added and mixed into the wood fiber and thermoplastic polymer components which, together with small quantities of certain other components, comprise the feedstock of the extruder. It has been found that it is possible to control the expansion of the foaming agent in a way which substantially confines it to the center of the extruded product, thereby achieving additional lightness without any sacrifice in surface characteristics or overall strength.

The amount of endothermic foaming agent in the feedstock mix has been found to be relatively critical. Referring again to FIG. 1, plank 14 exhibits bowed outer surfaces because of excessive expansion at its center 15. Similarly, the center 17 of plank 16 has not expanded sufficiently, or has even shrunk after leaving the extruder, giving the cross-section a "dog bone" shape which is also unacceptable. It is therefore important to adjust and balance the concentration of endothermic foaming agent against the wood fiber and thermoplastic polymer components of the feedstock mixture so that a plank 12 with dimensionally stable surfaces is achieved, and not a bowed plank 14 or sunken plank 16 which may possess a reduced density at its center, but which may be dimensionally unacceptable.

Figure 2:
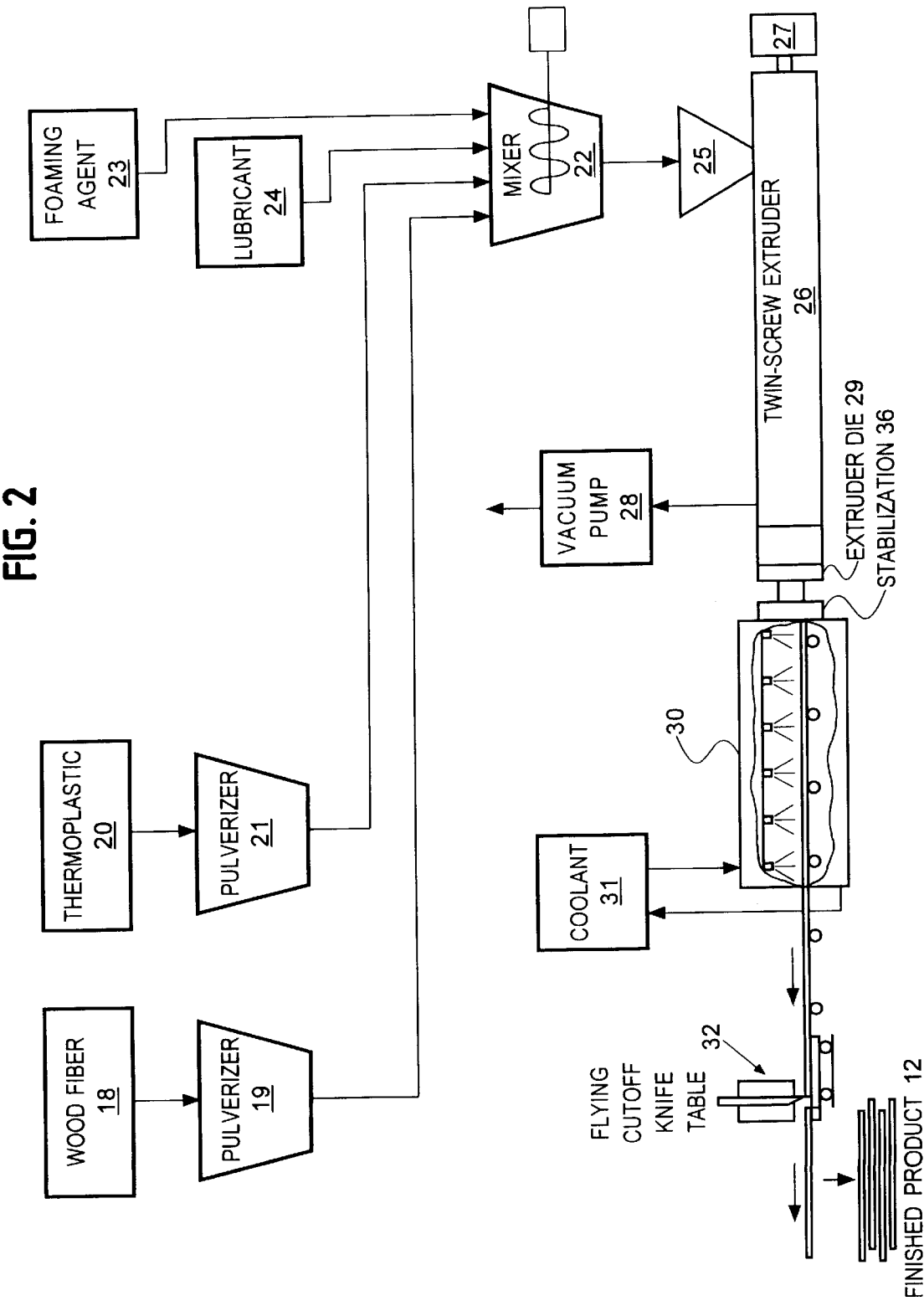
FIG. 2 is a schematic diagram of a process embodying the method of the present invention.

Turning to FIG. 2, there is shown in schematic form a production line for producing the improved, dimensionally stable plank 12 of the present invention. A supply of wood fiber or other fibrous cellulosic material 18 is introduced into a pulverizer or shredder 19 where it is finely divided into particles having a maximum length dimension generally no smaller than 80 mesh (about 0.007 inches), and no larger than about 0.5 inches, with the preferred range being 0–40 mesh. Another supply of thermoplastic material 20, which is preferably scrap polyethylene such as may be reclaimed from a materials recycling program, is similarly finely divided in a pulverizer or shredder 21 into particles generally no smaller than 80 mesh, with the preferred range being 10–60 mesh.

After pulverization, the finely divided wood fiber and thermoplastic particles are conveyed, such as by air conveyor, to a mixer 22. To the mixer 22 is also added a quantity of powdered endothermic foaming agent 23 such as bicarbonate of soda, and (if desired) up to about 1% of a wax lubricant 24.

In practice, the following ranges (parts by weight) of components have been found most desirable in achieving the objects of the invention:

|  | Wood Fiber | Polymer | Foaming Agent | Lubricant |
| --- | --- | --- | --- | --- |
| Composition A | 50 | 50 | 0.6 | 0.8 |
| Composition B | 60 | 40 | 0.3 | 1.0 |
| Composition C | 40 | 60 | 0.7 | 0.6 |

If desired, up to 5 parts of a thermoplastic olefin can also be added for optimizing melt flow characteristics.

According to the invention, the wood fiber, thermoplastic and foaming agent ingredients are thoroughly mixed in the mixer 22 and then conveyed, by means such as an air conveyor, to the input hopper 25 of a screw-type extruder 26. Excellent results have been achieved using the commercially available Cincinnati Milacron CM-80-BP twin screw extruder driven by motor 27. As is well known in the art, the twin screw extruder uses meshed counter-rotating flights (not shown) which have a larger pitch at the inlet end and a smaller pitch at the output end. The flights are heated internally, and the extruder barrel is also heated.

In combination, the heat imparted to the feedstock mixture by the heated extruder flights and barrel, plus the mechanical shearing and compression caused by the differential pitch of the flights, cause the feedstock mixture temperature to be raised to a point where it becomes plastic and homogenous, with the wood fibers being intimately mixed, coated and bound in the melted thermoplastic. In addition, any residual moisture in the feedstock components is vaporized, and as the mixture heats further, its temperature is desirably in the range of 320° F. to 400° F., which causes the endothermic foaming agent to become activated, absorbing some of the heat energy and releasing carbon dioxide gas.

As the heated and compressed feedstock approaches the extruder die 29 at the exit end of the extruder, excess volatiles including vaporized moisture and excess foaming agent gas (principally carbon dioxide) are removed from the extruder ahead of the molding die by a vacuum pump 28. In practice, it has been found that the best results are obtained at vacuum levels of at least 25 inches of mercury, with the best operating range being between 27 and 30 inches of mercury. With less vacuum, the resulting product is more sensitive to moisture, possibly because the remaining volatiles (water and carbon dioxide) permeating the melt and create fissures in the final product, into which water may penetrate. On the other hand, vacuum levels of 30 inches of mercury and more tend to negate the effect of the foaming agent, leading to insufficient density reduction, insufficient dimensional stability on leaving the extruder, and poor workability in the finished product.

Figure 3:
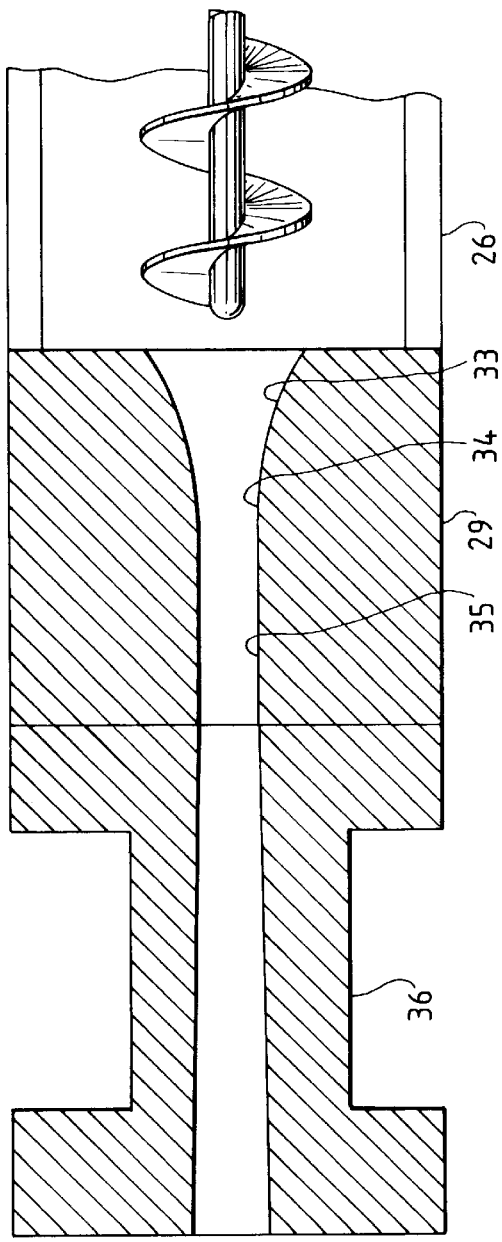
FIG. 3 is an enlarged horizontal cross-section of the forming die and stabilizing die which receives the molten exudate from the extruder.
Figure 4:
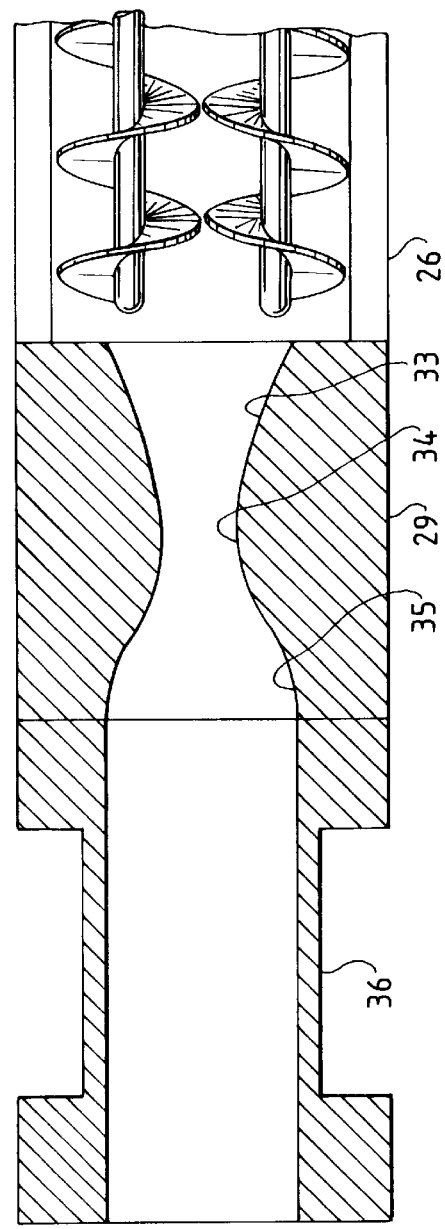
FIG. 4 is an enlarged vertical cross-section of the forming die and stabilizing die of FIG. 3.

With the process of the present invention, no special multiple die sets, and no fiber Alignment or stranding die, are needed to produce a strong, stable, moisture-resistant product. As shown in FIGS. 3 and 4, the extrusion die 29 has a converging entrance 33 leading to a throat 34 sized to produce the desired degree of pressure drop leaving the extruder, and a diverging exit 35 passage allowing for expansion of the melt in cross-section to form the desired profile of the extruded product.

From the exit passage the extruded product passes through a stabilization die 36 where it cools sufficiently to retain its shape upon entering the spray chamber 30. In practice, the extruded material leaving the throat of the die expands just sufficiently to take the fill the exit passage and thereby take its final shape, without undue pulling or dragging across its surface which might cause fissures known as "melt fractures".

From the extruder 26 and die 29, the formed ribbon of extruded product passes into a spray chamber 30 where it is cooled by spray jets of water from a reservoir 31 as is well understood in the art. Once cooled, it passes by conventional means to a cutoff station 32 where a traveling table or "flying" cutoff knife or saw cuts the product to any length desired.

A typical product manufactured by the method of the invention has been found to exhibit the following characteristics (typical values):

| Modulus of elasticity | 285, 758 psi | ASTM D4761 |
| --- | --- | --- |
| Modulus of rupture | 1676 psi | ASTM D4761 |
| Tensile strength | 786 psi | ASTM D198 |
| Shear strength | 706 psi | ASTM D143 |
| Screw withdrawal force | 650 lbs/in | ASTM D1761 |
| Nail withdrawal force | 177 lb/in | ASTM D1761 |
| Coefficient of thermal expansion | $4.5 \times 10^{-5}$ | ASTM E228 |
| Water absorption | 1.66% | ASTM D1037 |
| Density (S.G.) | 1.0 | |

We claim as our invention:

1. A process for manufacturing a composite extruded structural product having a desired profile from thermoplastic material and wood fiber comprising the steps of:

finely dividing the thermoplastic material and wood fiber each into particles no smaller than about 0.007 inches and no larger than about 0.5 inches in length;

mechanically mixing together the thermoplastic particles and the wood fiber particles in a ratio of between 60%–40% and 40%–60% by weight, together with an effective amount of a foaming agent, to form a feedstock mixture;

introducing the feedstock mixture, without pre-pelletization, into a screw-type extruder;

mechanically mixing, compressing and heating said feedstock mixture in said extruder until it becomes plastic and homogenous;

extruding said heated, plastic, homogenous mixture through a molding die into the structural profile of a desired product;

cooling said extruded product upon emerging from said molding die; and cutting the cooled extruded product into desired lengths.

2. The process of claim 1 in which an effective amount of foaming agent ingredient is selected to create an extruded product having a specific gravity of between about 0.8 and about 1.2 with no significant dimensional variation after cooling.

3. The process of claim 1 in which the effective amount of foaming agent ingredient is up to about 1% by weight.

4. The process of claim 1 in which the foaming agent ingredient is an endothermic foaming agent.

5. The process of claim 1 in which the foaming agent ingredient is bicarbonate of soda.

6. The process of claim 1 including the additional step of extracting excess volatiles under vacuum from said extruder, thereby producing an extruded product having a surface which is relatively dense, tight-grained and strong, and a center which is relatively more porous and less dense.

7. The process of claim 6 in which the vacuum extraction step is performed using a vacuum of at least 25 inches of mercury.

8. The process of claim 1 in which up to 1% by weight of wax lubricant is mixed into the feedstock mixture prior to introduction into the extruder.

9. The process of claim 1 in which up to 5% by weight of thermoplastic olefin is mixed into the feedstock mixture prior to introduction into the extruder.

10. The process of claim 1 in which the molding die has a converging entrance, a throat, and a diverging exit terminating in the profile of the desired structural product.

11. The process of claim 1 in which the extruded product upon emerging from said molding die is cooled with a direct water spray, and said cooled extruded product is cut into desired lengths with a traveling saw.

12. A process for manufacturing a composite extruded structural product having a desired profile from recycled polyethylene and wood fiber comprising the steps of:

finely dividing recycled polyethylene and wood fiber each into particles of a size between 10 mesh and 40 mesh;

mechanically mixing together the polyethylene particles and the wood fiber particles in a ratio of between 60%–40% and 40%–60% by weight, and an effective amount of a powdered endothermic foaming agent, to form a feedstock mixture;

introducing the feedstock mixture, without pre-pelletization, into a heated screw-type extruder discharging into a molding die, said molding die having an entrance, a throat, and an exit having the shape of a desired product;

mechanically mixing, compressing and heating said feedstock mixture in said extruder until it becomes plastic and homogenous;

extracting excess volatiles and foaming agent process gas under vacuum from said feedstock mixture prior to entering said molding die;

forcing said heated, plastic, homogenous mixture through said molding die to produce an extruded product having a surface which is relatively dense, tight-grained and strong, and a center which is relatively more porous and less dense;

cooling said extruded product upon emerging from said molding die; and cutting the cooled extruded product into desired lengths.

13. A composite extruded artificial lumber product having a surface which is relatively dense, tight-grained and strong, and a center which is relatively more porous and less dense, manufactured by the process of claim 1.

14. A composite extruded artificial lumber product having a surface which is relatively dense, tight-grained and strong, and a center which is relatively more porous and less dense, manufactured by the process of claim 12.

15. The composite extruded artificial lumber product of claim 13 having a specific gravity between about 0.8 and about 1.2 with no significant dimensional variation after cooling.

16. The composite extruded artificial lumber product of claim 14 having a specific gravity between about 0.8 and about 1.2 with no significant dimensional variation after cooling.

* * * * *